(12) United States Patent
Matejka et al.

(10) Patent No.: US 8,462,134 B2
(45) Date of Patent: Jun. 11, 2013

(54) MULTI-FINGER MOUSE EMULATION

(75) Inventors: Justin Frank Matejka, Etobicoke (CA); Tovi Grossman, Toronto (CA); Jessica Lo, Toronto (CA); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1016 days.

(21) Appl. No.: 12/493,980

(22) Filed: Jun. 29, 2009

(65) Prior Publication Data

US 2010/0328227 A1   Dec. 30, 2010

(51) Int. Cl.
*G06F 3/045* (2006.01)

(52) U.S. Cl.
USPC ...... 345/174; 345/163; 178/18.06; 178/18.07

(58) Field of Classification Search
USPC .... 345/156–163, 173–178; 178/18.01–18.07, 178/20.01–20.04
See application file for complete search history.

(56) References Cited

U.S. PATENT DOCUMENTS

| | | | | |
|---|---|---|---|---|
| 5,825,352 A * | 10/1998 | Bisset et al. | | 345/173 |
| 6,570,557 B1 * | 5/2003 | Westerman et al. | | 345/173 |
| 7,030,861 B1 * | 4/2006 | Westerman et al. | | 345/173 |
| 7,038,659 B2 * | 5/2006 | Rajkowski | | 345/156 |
| 7,705,830 B2 * | 4/2010 | Westerman et al. | | 345/173 |
| 2003/0048260 A1 * | 3/2003 | Matusis | | 345/173 |
| 2004/0021633 A1 * | 2/2004 | Rajkowski | | 345/156 |
| 2006/0125803 A1 * | 6/2006 | Westerman et al. | | 345/173 |

OTHER PUBLICATIONS

Albinsson, et al. "High Precision Touch Screen Interaction," vol. No. 5, Issue No. 1, *ACM CHI*. 105-112. (2003).
Balakrishnan, et al. "The Rockin'Mouse: Integral 3D Manipulation on a Plane," *ACM CHI*. 311-318. (1997).
Benko, et al. "Precise Selection Techniques for Multi-Touch Screens," *ACM CHI*, 1263-1272. (2006).
Brandl, et al. "Combining and Measuring the Benefits of Bimanual Pen and Direct-Touch Interaction on Horizontal Interfaces," *AVI*, 1-8. (2008).
Buxton, et al. "Issues and Techniques in Touch-Sensitive Tablet Input," *ACM SIGGRAPH*, 1-15. (1985).
Dietz, et al. "DiamondTouch: A Multi-User Touch Technology," Mitsubishi Electric Research Laboratories, *ACM UIST*, 1-10. (2003).
Echtler, et al. "Shadow Tracking on Multi-Touch Tables," *AVI*, 388-391, (2008).
Esenther, et al. "Fluid DTMouse: Better Mouse Support for Touch-Based Interactions," *AVI*, (2006).
FingerWorks, Inc. (2008). User's Guide. http://www.fingerworks.com/gesture_guide_mouse.html.
Fitzmaurice, et al. "Tracking Menus," vol. 5, Issue 2, *ACM UIS*,. 71-79, (2003).

(Continued)

*Primary Examiner* — Vijay Shankar
(74) *Attorney, Agent, or Firm* — Patterson & Sheridan, LLP

(57) ABSTRACT

One embodiment of the present invention sets forth a technique for emulating left, right, and center mouse button functionality for a multi-touch input device to provide end-users with full mouse functionality. Various finger to mouse button mapping techniques are used to specify the left, right or middle mouse buttons. A single finger is used for tracking while a second finger or thumb is used to activate or deactivate one of the mouse buttons. Multi-finger mouse emulation enables more precise cursor control, while avoiding occlusion of the cursor and end-user fatigue, thereby improving the overall end-user experience.

24 Claims, 13 Drawing Sheets

OTHER PUBLICATIONS

Forlines, et al. "HybridPointing: Fluid Switching Between Absolute and Relative Pointing with a Direct Input Device," *ACM UIST*, 211-220, (2006).

Forlines, et al. "Direct-Touch vs. Mouse Input for Tabletop Displays," *ACM CHI*, 647-656, (2007).

Grossman, et al. "Hover Widgets: Using the Tracking State to Extend the Capabilities of Pen-Operated Devices," *ACM CHI*, 861-870, (2006).

Grossman, et al. "Multi-Finger Gestural Interaction with 3D Volumetric Displays," *ACM UIST*, 61-70, (2004).

Hager-Ross, et al. "Quantifying the Independence of Human Finger Movements: Comparisons of Digits, Hands, and Movement Frequencies," *Journal of Neuroscience*, 20(22), 8542-8550, (2000).

Han, Jefferson Y. "Low-Cost Multi-Touch Sensing through Frustrated Total Internal Reflection," *ACM UIST*, 115-118, (2005).

Letessier, et al. "Visual Tracking of Bare Fingers for Interactive Surfaces," *ACM UIST*, 119-122, (2004).

Malik, Shahzad "An Exploration of Multi-Finger Interaction on Multi-Touch Surfaces," Univ. of Toronto, (2007).

Malik, et al. "Interacting with Large Displays from a Distance with Vision-Tracked Multi-Finger Gestural Input," *ACM UIST*, (2006).

Moscovich, Tomer "Principles and Applications of Multi-touch Interaction," Brown University, (2007).

Moscovich, et al. "Multi-Finger Cursor Techniques," *Graphics Interface*, 1-7, (2006).

Moscovich, et al. "Indirect Mappings of Multi-touch Input Using One and Two Hands," *ACM CHI*, (2008).

Olwal, et al. "Rubbing and Tapping for Precise and Rapid Selection on Touch-Screen Displays," *ACM CHI*, 295-304, (2008).

Potter, et al. "Improving the Accuracy of Touch Screens: An Experimental Evaluation of Three Strategies," *ACM CHI*, 27-32, (1988).

Rekimoto, Jun, "SmartSkin: An Infrastructure for Freehand Manipulation on Interactive Surfaces," *ACM CHI*, 113-120, (2002).

Sears, et al. "High Precision Touchscreens: Design Strategies and Comparison with a Mouse," *Int. Journal of Man-Machine Studies*, 43(4), 1-23, (1991).

Vogel, et al. "Shift: A Technique for Operating Pen-Based Interfaces Using Touch," *ACM CHI*, 657-666, (2007).

Von Hardenberg, et al. "Bare-Hand Human-Computer Interaction," *ACM PUI*, 1-8, (2001).

Wu, et al. "Multi-Finger and Whole Hand Gestural Interaction Techniques for Multi-User Tabletop Displays," *ACM UIST*, 193-202, (2003).

Wu, et al. "Gesture Registration, Relaxation, and Reuse for Multi-Point Direct-Touch Surfaces," *IEEE TableTop*, 183-190, (2006).

Zhang, et al. "Visual Panel: Virtual Mouse, Keyboard and 3D Controller with an Ordinary Piece of Paper," *ACM PUI*, 1-8, (2001).

\* cited by examiner

Chording Mapping
Technique
220

Tracking
Configuration
221

Left Button
Configuration
222

Center Button
Configuration
223

Right Button
Configuration
224

Distance Mapping
Technique
240

Tracking
Configuration
241

Left Button
Configuration
242

Center Button
Configuration
243

Right Button
Configuration
244

Side+Chording
Mapping Technique
— 260

Tracking
Configuration
261

Left Button
Configuration
262

Center Button
Configuration
263

Right Button
Configuration
264

Chording+Distance
Mapping Technique
270

Tracking
Configuration
271

Left Button
Configuration
272

Center Button
Configuration
273

Right Button
Configuration
274

MULTI-FINGER MOUSE EMULATION

BACKGROUND OF THE INVENTION

1. Field of the Invention

Embodiments of the present invention relate generally to emulation of mouse functionality and, more specifically, to emulation of mouse functionality for a multi-touch input device.

2. Description of the Related Art

Multi-touch input devices and associated interfaces offer a new modality of interaction for users. Unfortunately, though, multi-touch input raises a number of interesting yet difficult challenges when it comes to the design of user interfaces. Multi-touch input using a multi-touch display device generally assumes direct input, where the end-user interacts directly with graphical imagery located under the points of contact with the display surface, e.g., a display screen that may be integrated with the multi-touch input device. Due to this direct interaction, the multi-touch input devices suffer from the same drawbacks as traditional single point touch screens. For example, direct interaction may cause user fatigue, reduced precision, and occlusions from the end-user's hand.

However, even if the fatigue, precision, occlusion problems are solved, almost all research to date supporting direct touch interaction has only considered emulating a "left click" event, i.e., activation and deactivation of the left mouse button. In order for an end-user to interact with many graphical interfaces in multi-touch input environments, emulation of the right and middle buttons is also desirable and in some cases essential.

As the foregoing illustrates, what is needed in the art is a technique for emulation of left, right, and center mouse button functionality for a multi-touch input device.

SUMMARY OF THE INVENTION

One embodiment of the present invention sets forth a method for emulating left, right, and center mouse button functionality for a multi-touch input device. The method includes the steps of displaying a cursor on a display device at a position based on a tracking digit that is in contact with the multi-touch input device, receiving a signal indicating that a non-tracking digit is in contact with the multi-touch input device, determining which mouse button of a multiple button mouse is mapped to the non-tracking digit for emulation to produce an emulated mouse button, and activating the emulated mouse button or deactivating the emulated mouse button based on a button activation mode.

One advantage of the disclosed method is that it provides end-users with full mouse functionality using multi-finger input for a multi-touch input device. A side-plus-distance chording technique is used to specify the left, right or middle mouse buttons. A single finger is used for tracking while a second finger or thumb is used to activate or deactivate one of the mouse buttons. Multi-finger mouse emulation using the side-plus-distance chording technique allows for end precise cursor control, while avoiding occlusion of the cursor and end-user fatigue, thereby improving the overall end-user experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
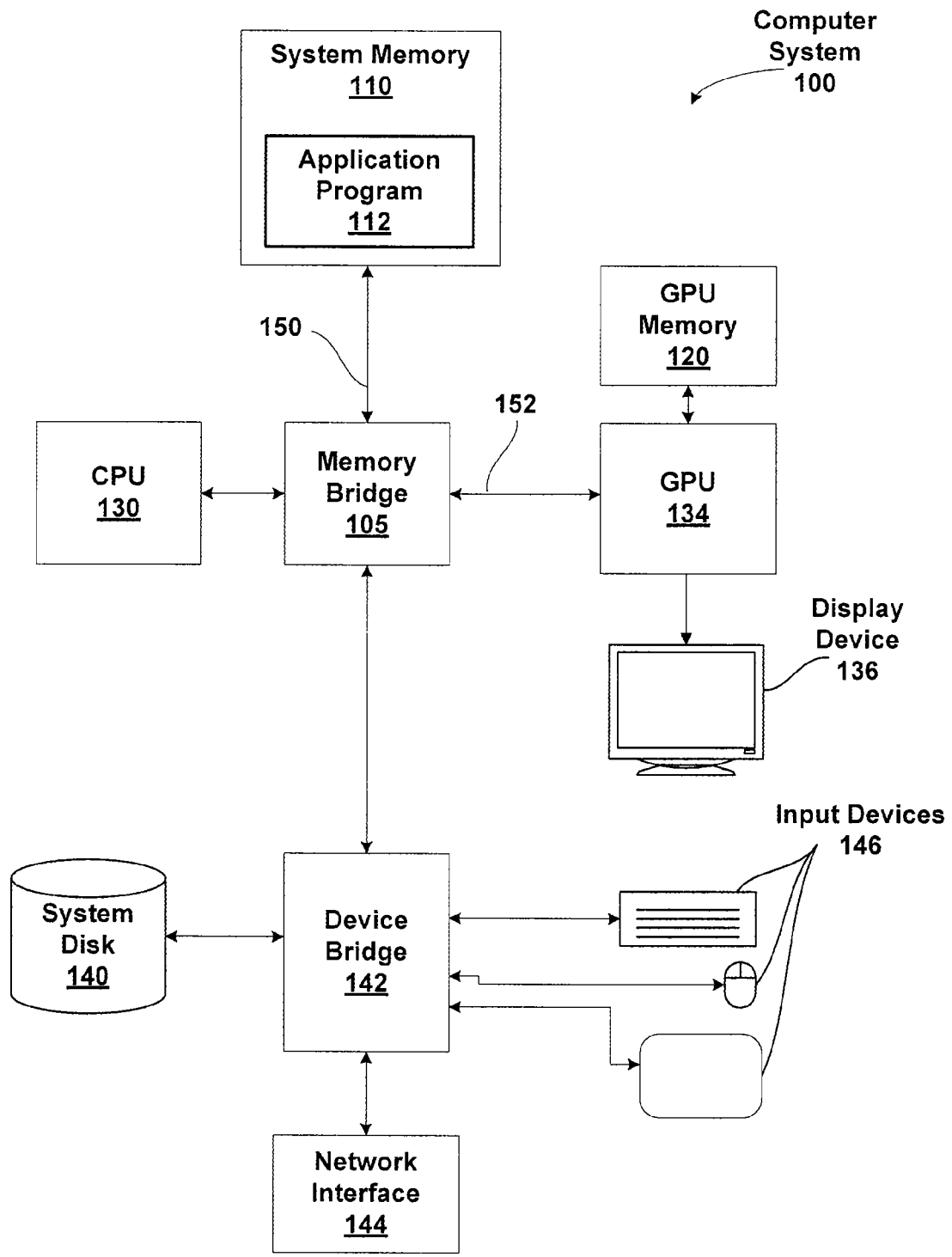
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 105, a display device 136, a system disk 140, a device bridge 142, a network interface 144, and input devices 146, e.g., a mouse, keyboard, touchpad, and the like. When display device 136 is a multi-touch display device, such as SMART's Table and Microsoft's Surface, one or more of input devices 146 may be omitted and the end-user may use his or her hand to provide inputs directly to the multi-touch display device. The display device 136 may be configured to use a capacitive sensing, camera generated images, or any other technology known to those skilled in the art to sense multi-finger and hand input. In other embodiments, a multi-touch input device, such as a multi-touch touchpad, is separate from the display device 136. In one embodiment, system memory 110 is configured to store an application program 112 that is configured to provide an interface for multi-finger mouse emulation.

The CPU 130 communicates with the system memory 110 via the memory bridge 105, which may be, e.g., a Northbridge device or subsystem. System memory 110 is configured to store application programs, as well as data used by or generated by the CPU 130. System memory 110 is coupled to the memory bridge 105 via a system memory bus 150. The memory bridge 105 is coupled to the GPU 134 via a GPU system bus 152. The GPU system bus 152 may comprise any technically feasible data interconnect, such as the well-known personal computer interconnect (PCI) express bus. The memory bridge 105 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 105 when accessed by the CPU 130. In some embodiments, the integrated circuit implementing the CPU 130 may incorporate additional functional blocks, such as the memory bridge 105 and the device bridge 142. In alternative embodiments, the integrated circuit implementing the GPU 134 may incorporate additional functional blocks, such as the memory bridge 105 and the device bridge 142.

The device bridge 142 is coupled to a hard drive 140, a network interface 144, and input devices 146. The hard drive 140 provides mass storage of programs and data. The network interface 144 provides network connectivity to other computers using a local area network (LAN) interface using any suitable technology, such as Ethernet. The input devices 146 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

Emulating the functionality of a mouse for a multi-touch input device may seem to defeat the purpose of having the multi-touch system in the first place. However, more likely than not, only a minority of today's end-user applications will be completely rethought and re-engineered to provide user experiences specifically tailored for multi-touch input. While some applications will fully support multi-touch interaction, others will only possess specific modes supporting multi-touch input, and still others will continue to rely on traditional mouse-driven graphical user interface elements. For example, consider an end-user who is scaling and rotating photos using multi-touch interaction, who then decides to email the photos to a friend. The end-user may be required to switch to an email client, which may not support multi-touch interaction. Alternatively, the photo browsing application may only contain a traditional graphics user interface menu for email functions. In either case, the end-user would be left frustrated if required to perform the email function without the aid of a mouse emulation technique since the user interface menu assumes that the end-user provides input using a mouse. In order to emulate a multiple button mouse using a multi-touch input device, a mouse-to-finger mapping is defined that specifies combinations of one or more digits that are mapped to each of the multiple buttons of the mouse.

Figure 2A:
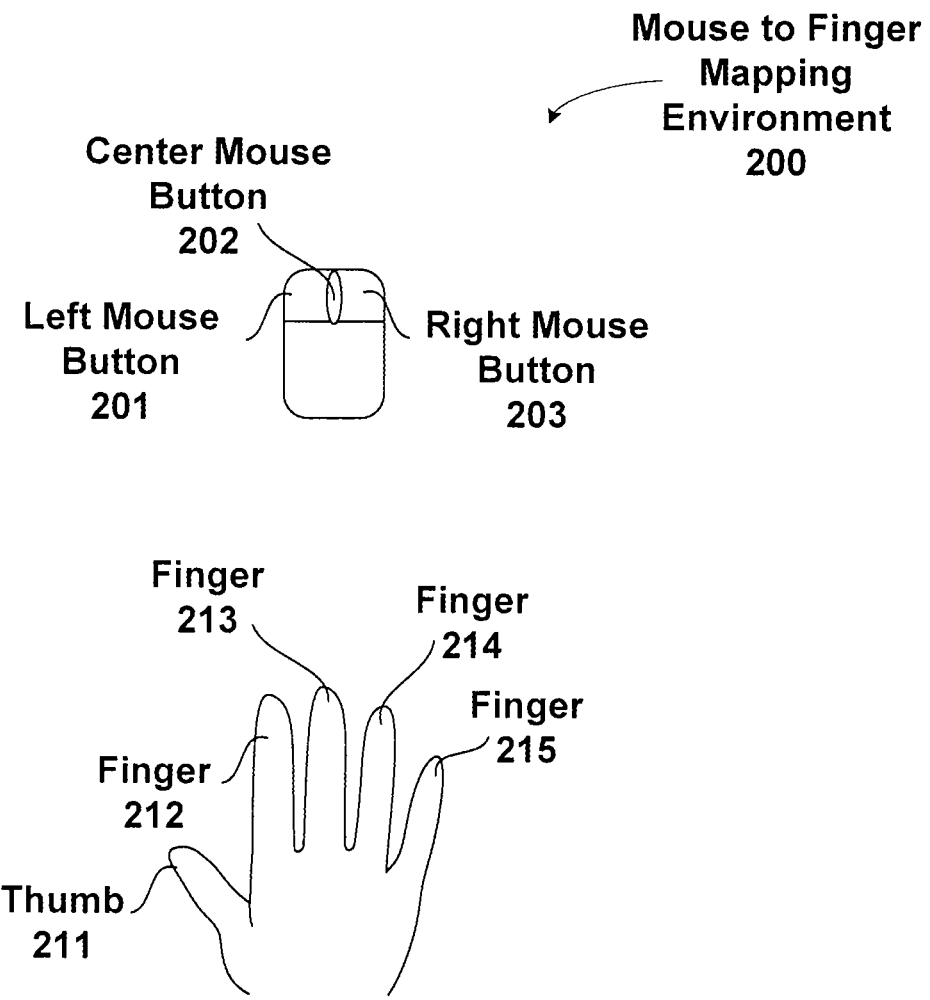
FIG. 2A illustrates a mouse-to-finger mapping environment, according to one embodiment of the invention.

FIG. 2A illustrates a mouse-to-finger mapping environment 200, according to one embodiment of the invention. A conventional mouse input device includes a left mouse button 201, a center mouse button 202, and a right mouse button 203. One or more of the digits of the human hand, thumb 211 and fingers 212, 213, 214, and 215 are mapped to the different mouse buttons to emulate the functionality of the mouse input device for a multi-touch input device when one or more of the digits is in contact with the multi-touch input device. Using a single hand to provide multi-finger input to activate one or more mouse buttons is advantageous since the end-user can then use the other hand for additional interactions, such as scrolling.

A conventional mouse is capable of providing numerous forms of input. Some of the forms of functionality to be considered when defining a mouse-to-finger mapping for mouse emulation include tracking state, multiple buttons, mouse button chording (simultaneously activating or deactivating more than one mouse button), and a scroll wheel. Tracking state should support cursor positioning without triggering a mouse button. Each of the left, middle, and right buttons should be supported for both clicking and dragging operations. While some mice have additional buttons, those buttons are rarely required for application use, and are used primarily for shortcuts. Many applications require simultaneous use of multiple mouse buttons (chording) and emulation should provide mouse button chording input. Many applications provide scrolling using the middle mouse button, so emulation of a dedicated scroll wheel may not be essential.

Design considerations related to multi-finger emulation of a mouse for a multi-touch input device include end-user fatigue, precision, visibility support, edge support, intuitive mapping, fewest touch points, scale independence, orientation independence, and timing independence. The mapping of digits to emulate mouse functions should minimize end-user fatigue resulting from mental and physical discomfort. Emulation should also allow for precise input and minimize occlusion effects caused by the hand. The end-user should be allowed to position and use the cursor along the display space edges. The mapping between the digits and the mouse buttons should relate the physical mouse layout in order to enable to end-user to easily learn and remember the mapping. Relying on the fewest touch points as possible for the mapping improves comfort and minimizes friction when dragging to move the cursor. The size and orientation of the end-user's hand relative to the display device should not negatively impact the mouse emulation. Finally, reliance on timeout periods should be avoided since time constraints impede fluidity of use. These design considerations influenced the various mapping techniques that are described in conjunction with FIGS. 2B through 2G and FIG. 3.

Figure 2B:
FIG. 2B illustrates the mouse-to-finger mapping for a chording technique, according to one embodiment of the invention.
Figure 2B:
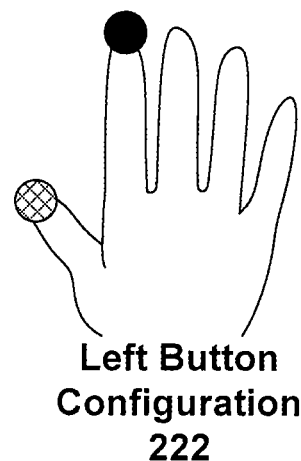
Figure 2B:
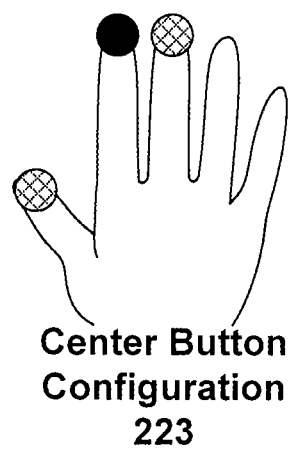
Figure 2B:
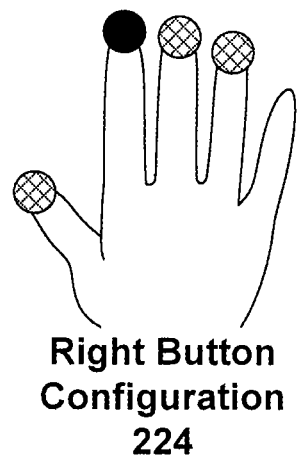

In order to distinguish between left, right, and center mouse button events, various characteristics are used by the mouse emulation techniques shown in FIGS. 2B through 2G and FIG. 3. Chording refers to using the number of fingers in contact with the display device to determine which button should be activated or deactivated by an end-user's input. The position of the digit relative to the tracking digit(s), or "side,"

may also be used to determine the button determine which button should be activated or deactivated by an end-user's input. Activation and deactivation of buttons may also be determined based on the distance at which digits are placed relative to the tracking digit(s). Alternatively, the end-user may perform motions with his/her digits to indicate which button should be activated and deactivated. In some embodiments, a mechanism, e.g., a camera, may be used to identify which digit is used by the end-user. so FIG. 2B illustrates the mouse-to-finger mapping for a chording technique, according to one embodiment of the invention. The chording mapping technique 220 uses thumb 211 and fingers 212, 213, and 214 for mouse emulation. A tracking configuration 221 uses the finger 212 to move the cursor. When a single finger is used for tracking, as is the case for most of the emulation techniques shown in FIGS. 2B through 2G and FIG. 3, the mapping function is applied to the point at which the single finger makes contact with the multi-touch input device.

The chording mapping technique 220 specifies a left button configuration 222 that uses the thumb 211 to activate the left button for multi-finger mouse emulation. The chording mapping technique 220 specifies a center button configuration 223 that uses the thumb 211 and the finger 213 to activate the center button for multi-finger mouse emulation. The chording mapping technique 220 specifies a right button configuration 224 that uses the thumb 211, the finger 213, and the finger 214 to activate the right button for multi-finger mouse emulation.

The maximum number of touch points used by the chording mapping technique 220 is four. The placement of the non-tracking digits (thumb 211 and fingers 213, 214, and 215) is irrelevant, so the chording mapping technique 220 is scale and orientation independent. However, a timeout is needed to determine how long to wait for additional digits to contact the multi-touch input device before registering a first contact by the thumb 211 as a left mouse button activation. In some embodiments, a timeout of 150 ms is used. Finally, mouse button chording is not possible when the chording mapping technique 220 is used since it is not possible to distinguish between a simultaneous activation of both the right and left mouse buttons and activation of only the center mouse button or only the left button.

Figure 2C:
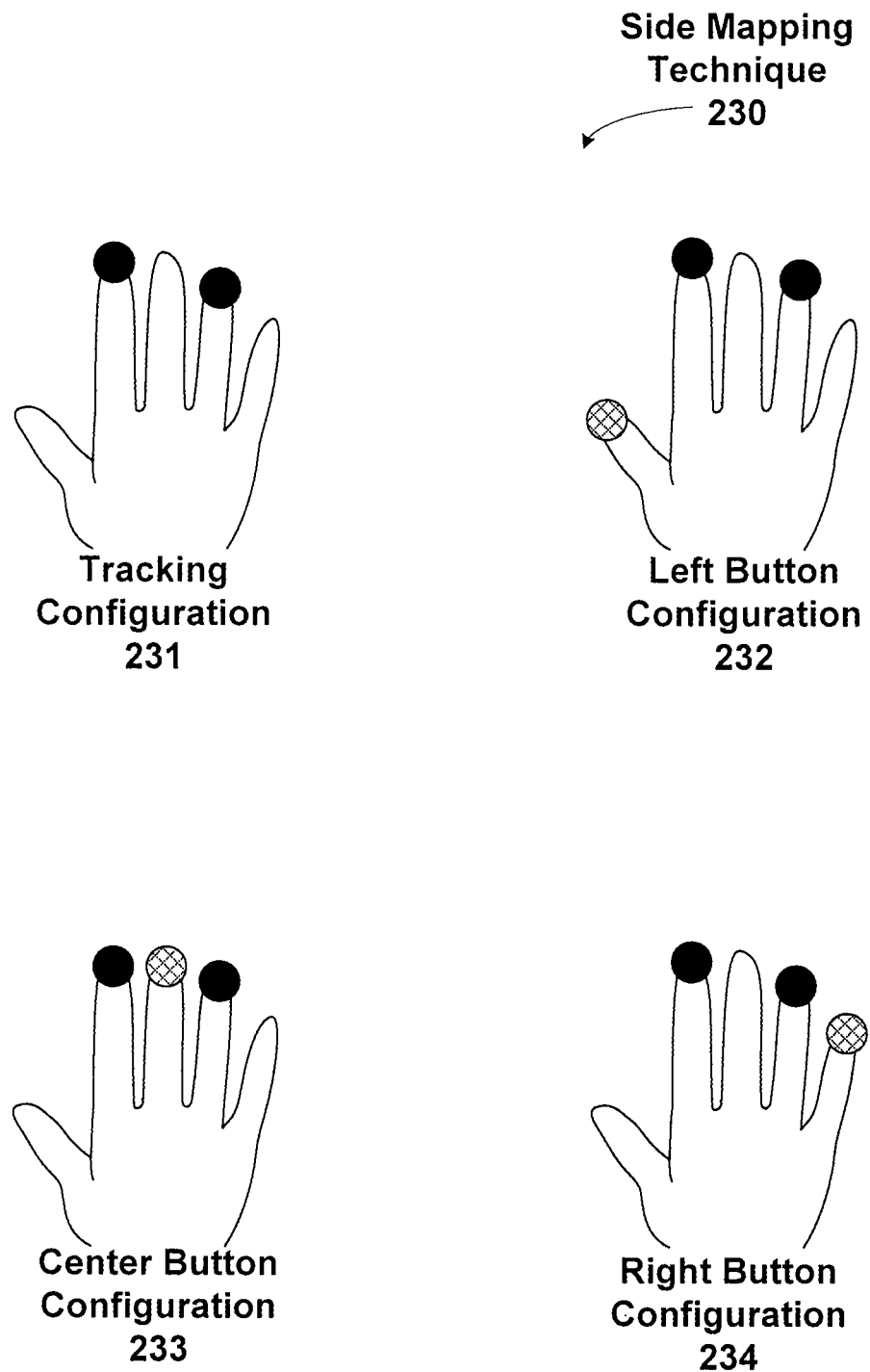
FIG. 2C illustrates the mouse-to-finger mapping for a side technique, according to one embodiment of the invention.

FIG. 2C illustrates the mouse-to-finger mapping for a side mapping technique 230, according to one embodiment of the invention. The side mapping technique 230 uses thumb 211 and fingers 212, 213, 214, and 215 for mouse emulation. A two finger tracking configuration 231 uses the fingers 212 and 214 to move the cursor. The cursor is placed at the midpoint of fingers 212 and 214, allowing good visibility of the cursor. Also, only a single digit is needed to activate any one of the three mouse buttons.

The side mapping technique 220 specifies a left button configuration 232 that uses the thumb 211 to activate the left button for multi-finger mouse emulation. The side mapping technique 230 specifies a center button configuration 233 that uses the finger 213 to activate the center button for multi-finger mouse emulation. The side mapping technique 230 specifies a right button configuration 234 that uses the finger 215 to activate the right button for multi-finger mouse emulation.

The maximum number of touch points used by the side mapping technique 230 is three. The side mapping technique 230 is independent of the size of the hand, but the technique is not independent of the orientation since two fingers are used for tracking. No timeout is needed to wait for additional digits to contact the multi-touch input device for a mouse button activation since a single digit is mapped to each button. Finally, mouse button chording is possible when the side mapping technique 230 is used since a single digit is used to activate each mouse button.

Figure 2D:
FIG. 2D illustrates the mouse-to-finger mapping for a distance technique, according to one embodiment of the invention.
Figure 2D:
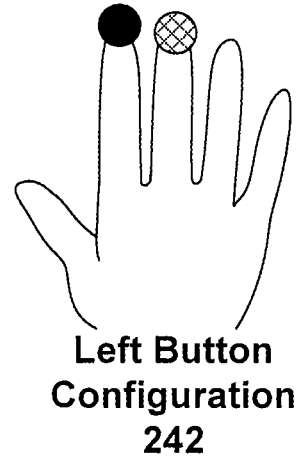
Figure 2D:
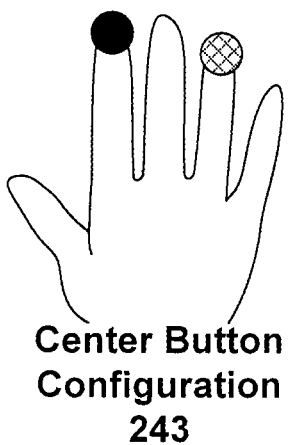
Figure 2D:
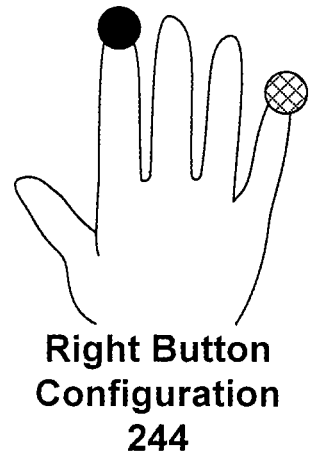

FIG. 2D illustrates the mouse-to-finger mapping for a distance mapping technique 240, according to one embodiment of the invention. The distance mapping technique 240 defines a near (150 pixel), medium (150 to 250 pixel), and far (greater than 250 pixel) distance to the right of the finger 212, for activating the left, center, and right mouse buttons.

The distance mapping technique 240 uses fingers 212, 213, 214, and 215 for mouse emulation, and, only a single digit is needed to activate any one of the three mouse buttons. A single finger tracking configuration 241 uses the finger 212 to move the cursor. The distance mapping technique 240 specifies a left button configuration 242 that uses the finger 213 to activate the left button for multi-finger mouse emulation. The side mapping technique 230 specifies a center button configuration 243 that uses the finger 214 to activate the center button for multi-finger mouse emulation. The side mapping technique 230 specifies a right button configuration 244 that uses the finger 215 to activate the right button for multi-finger mouse emulation.

The maximum number of touch points used by the distance mapping technique 240 is two. The distance mapping technique 240 is independent of the orientation of the hand, but is not independent of the size of the hand since specific distances are used to determine which button should be activated. No timeout is needed to wait for additional digits to contact the multi-touch input device for a mouse button activation since a single digit is mapped to each button. Finally, mouse button chording is possible when the distance mapping technique 240 is used since a single digit is used to activate each mouse button.

Figure 2E:
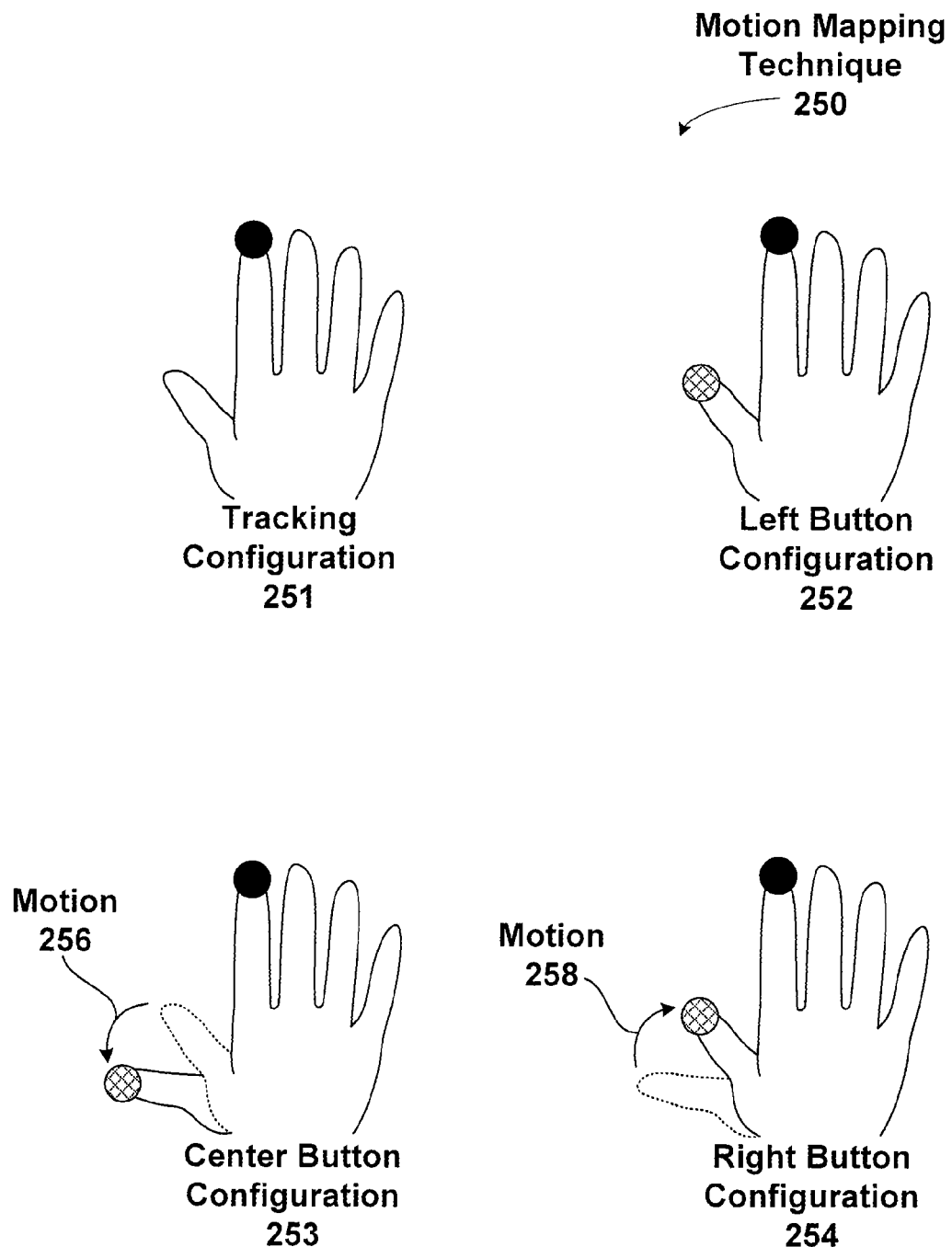
FIG. 2E illustrates the mouse-to-finger mapping for a motion technique, according to one embodiment of the invention.

FIG. 2E illustrates the mouse-to-finger mapping for a motion mapping technique, according to one embodiment of the invention. The motion mapping technique 250 uses thumb 211 and finger 212 for mouse emulation. A tracking configuration 251 uses the finger 212 to move the cursor. The thumb 211 is used to select each of the three mouse buttons. The motion mapping technique 250 specifies a left button configuration 252 that uses a tapping of the thumb 211 on the multi-touch input device to activate the left button for multi-finger mouse emulation. The motion mapping technique 250 specifies a center button configuration 253 that activates the center button for multi-finger mouse emulation when the thumb 211 is pressed down and moved to the left. The motion mapping technique 250 specifies a right button configuration 254 that activates the right button for multi-finger mouse emulation when the thumb 211 is pressed down and moved to the right.

The maximum number of touch points used by the chording mapping technique 250 is two. The motion mapping technique 250 is neither scale nor orientation independent. A timeout is needed to determine how long to wait for a swipe motion, before registering a first contact by the thumb 211 as a tap and activating the left mouse button. In some embodiments, a timeout of 150 ms is used. Finally, mouse button chording is not possible when the motion mapping technique 250 is used since it is not possible to perform the motions simultaneously to activate two or more mouse buttons.

Figure 2F:
FIG. 2F illustrates the mouse-to-finger mapping for a side-plus-chording technique, according to one embodiment of the invention.
Figure 2F:
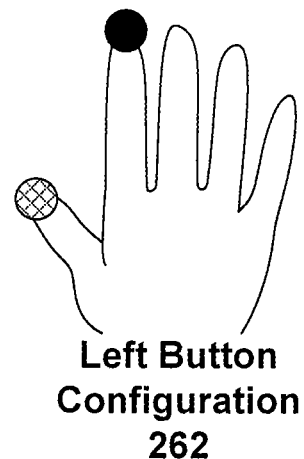
Figure 2F:
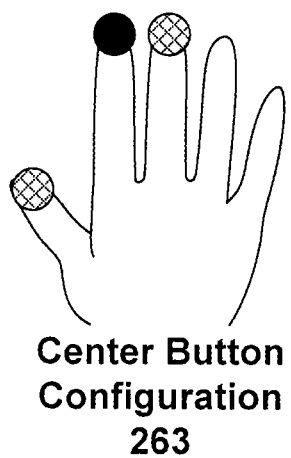
Figure 2F:
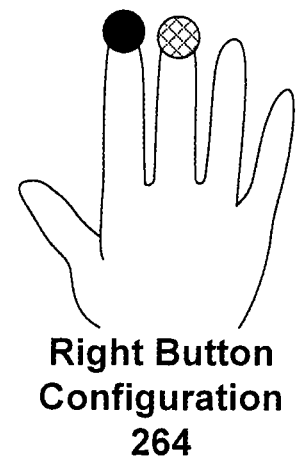

FIG. 2F illustrates the mouse-to-finger mapping for a side-plus-chording mapping technique, according to one embodiment of the invention. The side-plus-chording mapping technique 260 uses side information to distinguish between right and left mouse button activations. The thumb 211 and fingers 212 and 213 are used for mouse emulation. A single finger tracking configuration 261 uses the finger 212 to move the cursor.

The side-plus-chording mapping technique 260 specifies a left button configuration 262 that uses the thumb 211 to activate the left button for multi-finger mouse emulation. The side-plus-chording mapping technique 260 specifies a center button configuration 263 that uses chording with the thumb 211 and the finger 213 to activate the center button for multi-finger mouse emulation. The side-plus-chording mapping technique 260 specifies a right button configuration 264 that uses the finger 213 to activate the right button for multi-finger mouse emulation.

The maximum number of touch points used by the side-plus-chording mapping technique 260 is three. The side-plus-chording mapping technique 260 is neither scale nor orientation independent. However, a timeout is needed to determine how long to wait for additional digits to contact the multi-touch input device before registering a first contact by the thumb 211 as a left mouse button activation. In some embodiments, a timeout of 150 ms is used. Finally, mouse button chording is not possible when the side-plus-chording mapping technique 260 is used since it is not possible to distinguish between a simultaneous activation of both the right and left mouse buttons and activation of only the center mouse button.

Figure 2G:
FIG. 2G illustrates the mouse-to-finger mapping for a chording-plus-distance technique, according to one embodiment of the invention.
Figure 2G:
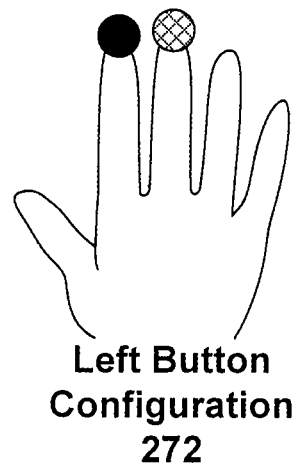
Figure 2G:
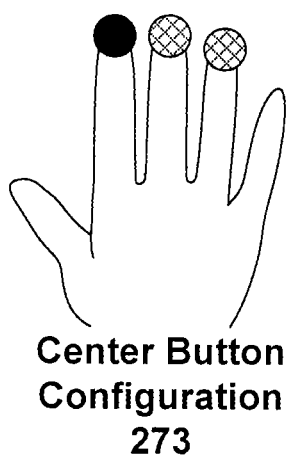
Figure 2G:
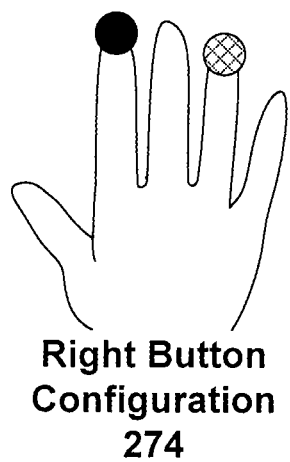

FIG. 2G illustrates the mouse-to-finger mapping for a chording-plus-distance mapping technique, according to one embodiment of the invention. The chording-plus-distance mapping technique 270 is similar to the side-plus-chording mapping technique 260, except that distance is used to distinguish between the left and right mouse buttons and chording is used to activate the center button. The fingers 212, 213, and 214 are used for mouse emulation. A single finger tracking configuration 271 uses the finger 212 to move the cursor.

Pressing the finger 213 close, e.g., within 150 pixels, to the finger 212 activates the left mouse button when the chording-plus-distance mapping technique 270 is used for multi-finger mouse emulation, as shown in the left button configuration 272. The chording-plus-distance mapping technique 270 specifies a center button configuration 273 that uses the fingers 213 and 214 to activate the center button for multi-finger mouse emulation. Pressing the finger 214 further from, e.g., greater than 150 pixels, the finger 212 activates the right mouse button when the chording-plus-distance mapping technique 270 is used for multi-finger mouse emulation as shown in the left button configuration 274.

The maximum number of touch points used by the chording-plus-distance mapping technique 270 is two. The chording-plus-distance mapping technique 270 is independent of the orientation of the hand, but is not independent of the size of the hand since specific distances are used to determine which button should be activated. However, a timeout is needed to determine how long to wait for additional digits to contact the multi-touch input device before registering a first contact by the finger 213 as a left mouse button activation or before registering a first contact by the finger 214 as a right mouse button activation. In some embodiments, a timeout of 150 ms is used. Finally, mouse button chording is not possible when the chording-plus-distance mapping technique 270 is used since it is not possible to distinguish between a simultaneous activation of both the right and left mouse buttons and activation of only the center mouse button.

Figure 3:
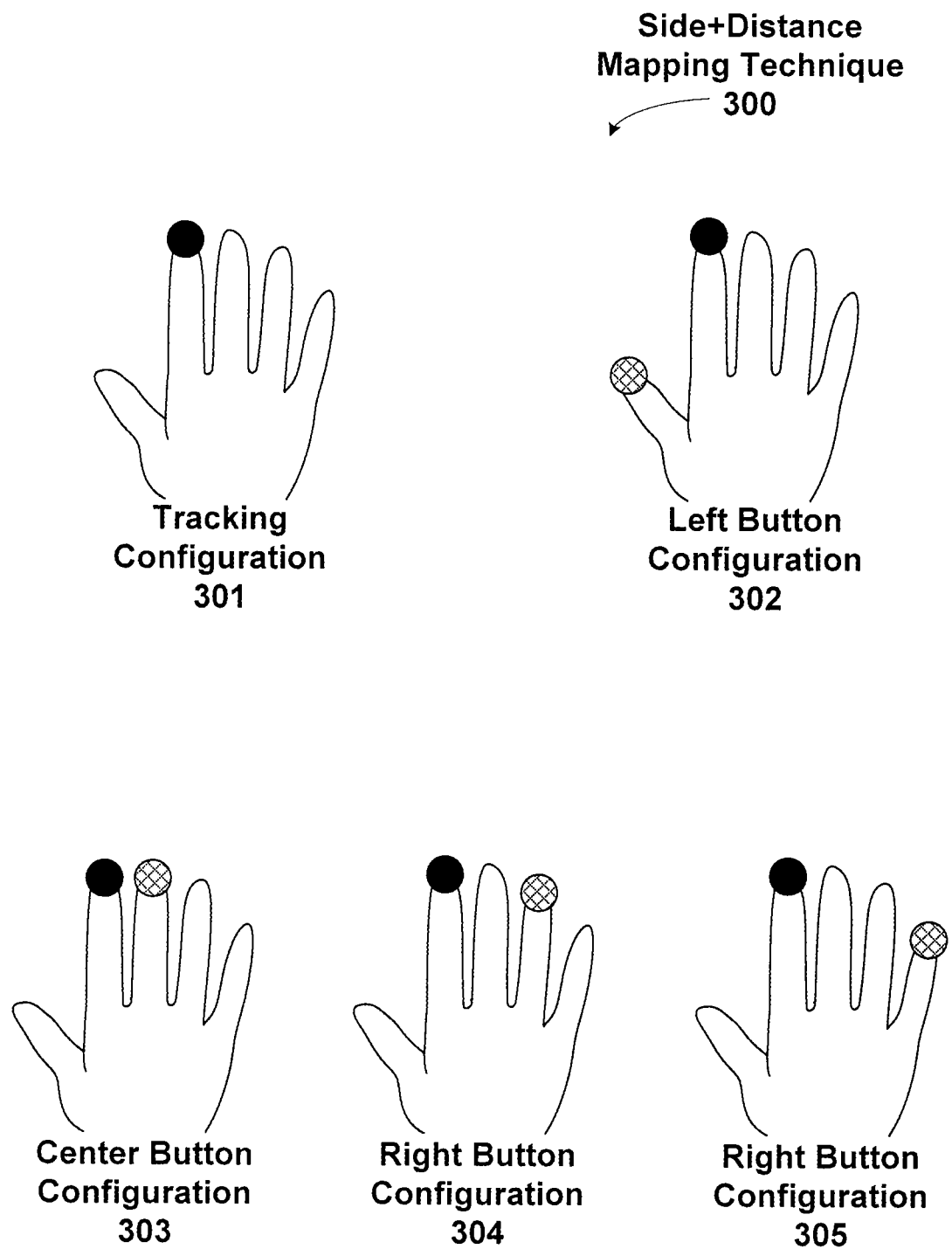
FIG. 3 illustrates the mouse-to-finger mapping for a side-plus-distance technique, according to one embodiment of the invention.

FIG. 3 illustrates the mouse-to-finger mapping for a side-plus-distance technique, according to one embodiment of the invention. The side-plus-distance mapping technique 300 defines a close (less than 150 pixels) and far (greater or equal to 150 pixels) distance to the right of the finger 212 for activating the center and right mouse buttons. The distance mapping technique 240 uses thumb 211 and fingers 212, 213, and 214 or 215 for mouse emulation, and only a single digit is needed to activate any one of the three mouse buttons. A single finger tracking configuration 301 uses the finger 212 to move the cursor. The thumb 211 is dedicated for left button activation, as shown in the left button configuration 302.

When the side-plus-distance mapping technique 300 is used for multi-finger mouse emulation, pressing the finger 213 close to the finger 212, e.g., within 150 pixels of the finger 212 measured center to center, activates the center mouse button, as shown in the center button configuration 303. When the side-plus-distance mapping technique 300 is used for multi-finger mouse emulation, pressing the finger 214 or the finger 215 far from the finger 212, e.g., equal or greater than 150 pixels of the finger 212, activates the right mouse button, as shown in the right button configurations 304 and 305.

The maximum number of touch points used by the side-plus-distance mapping technique 300 is two. The side-plus-distance mapping technique 300 is not independent of either the size or orientation of the hand since specific distances and relative positions (sides) are used to determine which button should be activated. No timeout is needed to wait for additional digits to contact the multi-touch input device for a mouse button activation since a single digit is mapped to each button. Finally, mouse button chording is possible when the side-plus-distance mapping technique 300 is used since a single digit is used to activate each mouse button.

A button activation mode of either momentary or toggle may be specified for any of the various mapping techniques. Button activation reflects how the button-down and button-up events are actually initiated. When a momentary activation mode is used, a button-down event is registered when the end-user contacts the touch screen with a digit or digits and the state of the button transitions from not active to active. By releasing the digit or digits from the screen and removing contact, the corresponding button-up event is registered and the state of the button transitions from active to not active.

When a toggle activation mode is used a button-down or button-up event occurs after a tap has occurred (the finger touches the screen and is lifted from the screen). If a button was previously activated, the button is in an activated state and tapping the screen registers a button-up event causing the state of the button to toggle from not activated to activated. Otherwise, when a button is not in an activated state, tapping the screen registers a button-down event and the state of the button toggles from the not activated state to the activated state. Another potential button activation mode relies on detecting pressure differences. Pressing firmly on the multi-touch display registers a button-down event and releasing the pressure registers a button-up event.

As previously explained, many factors are considered for multi-finger emulation of a multiple button mouse. The finger-to-button mapping techniques are designed for a minimum number of touch points, scale independence, orientation independence, and timing independence. The cursor mapping that defines how the cursor is positioned in relation to the point of contact with a multi-touch display device should be designed to allow for precise input and minimize occlusion effects caused by the hand, when the multi-touch input device is integrated with the display device. Numerous challenges occur when trying to operate a high resolution graphics user interface with digits that may obscure the underlying data and the cursor. Several different cursor position mappings may be used with multi-finger mouse emulation as shown in FIGS. 4A through 4D. Although FIGS. 4A through 4D illustrate a multi-touch input device that is integrated with a display device, the cursor mapping techniques may also be applied to display devices that are separate from the multi-touch input device.

Figure 4A:
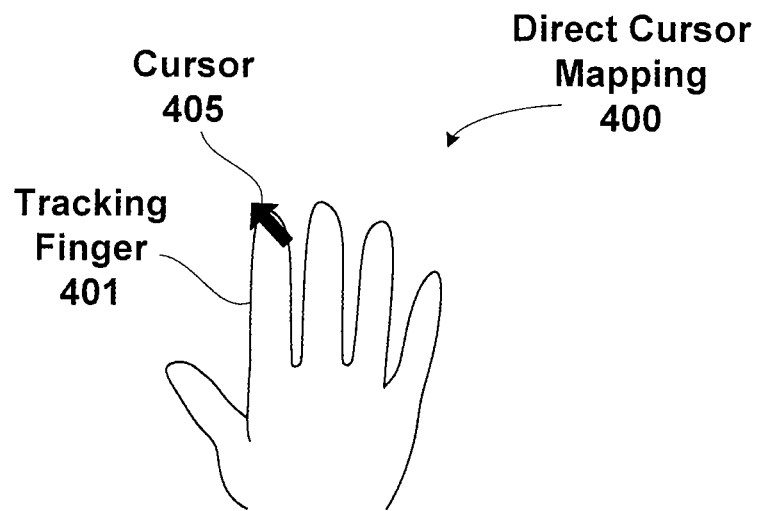
FIG. 4A illustrates a direct cursor mapping, according to one embodiment of the invention.

FIG. 4A illustrates a direct cursor mapping 400, according to one embodiment of the invention. The direct cursor mapping 400 is the most traditional form of input for conventional touch screens. The cursor 405 is placed directly where the tracking finger 401 contacts the multi-touch display device. While intuitive, the direct cursor mapping 400 causes the tracking finger 401 to occlude the cursor 405, and selections may become difficult as targets become smaller.

Figure 4B:
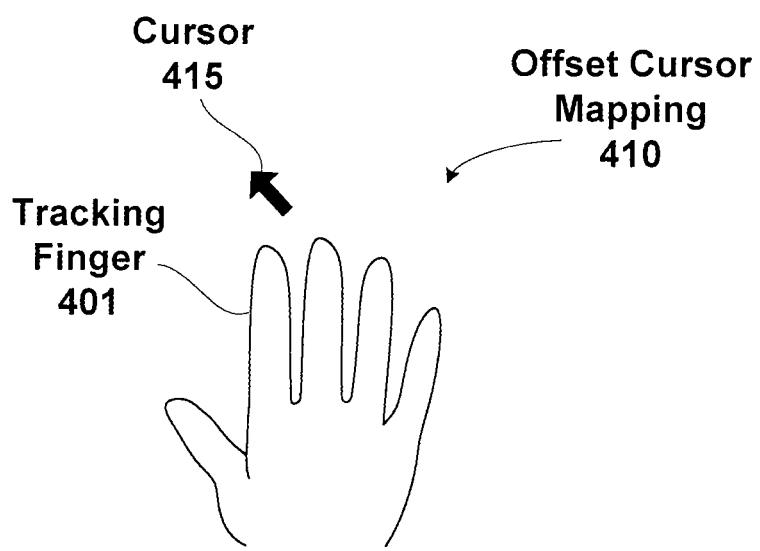
FIG. 4B illustrates an offset cursor mapping, according to one embodiment of the invention.

FIG. 4B illustrates an offset cursor mapping 410, according to one embodiment of the invention. The offset cursor mapping 410 positions the cursor 415 at a position that is offset relative to the position of the tracking finger, e.g., slightly above the position of the tracking finger 401, so that the tracking finger 401 does not occlude the cursor 415. However, sometimes end-users need to guess where the cursor 415 will be placed, and the bottom of the multi-touch display device may not be accessible.

Figure 4C:
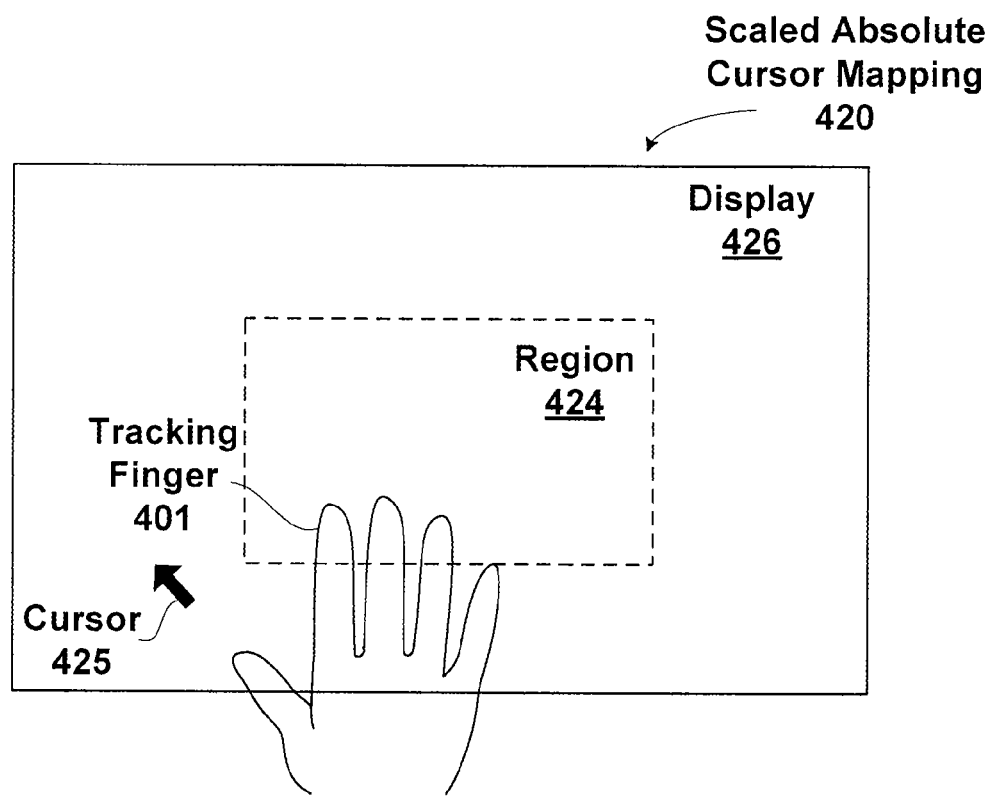
FIG. 4C illustrates a scaled absolute cursor mapping, according to one embodiment of the invention.

FIG. 4C illustrates a scaled absolute cursor mapping 420, according to one embodiment of the invention. The problem of accessibility of the multi-touch display device may be resolved by using the scaled absolute cursor mapping 420. The scaled absolute cursor mapping 420 defines a region 424 within the display 426. Each point within the smaller region 424 has a corresponding point on the display 426, thus allowing all points of the multi-touch display 426 to be accessed. The position of the tracking finger 401 within the region 424 is mapped to a corresponding position on the multi-touch display 426 where the cursor 425 is displayed.

Figure 4D:
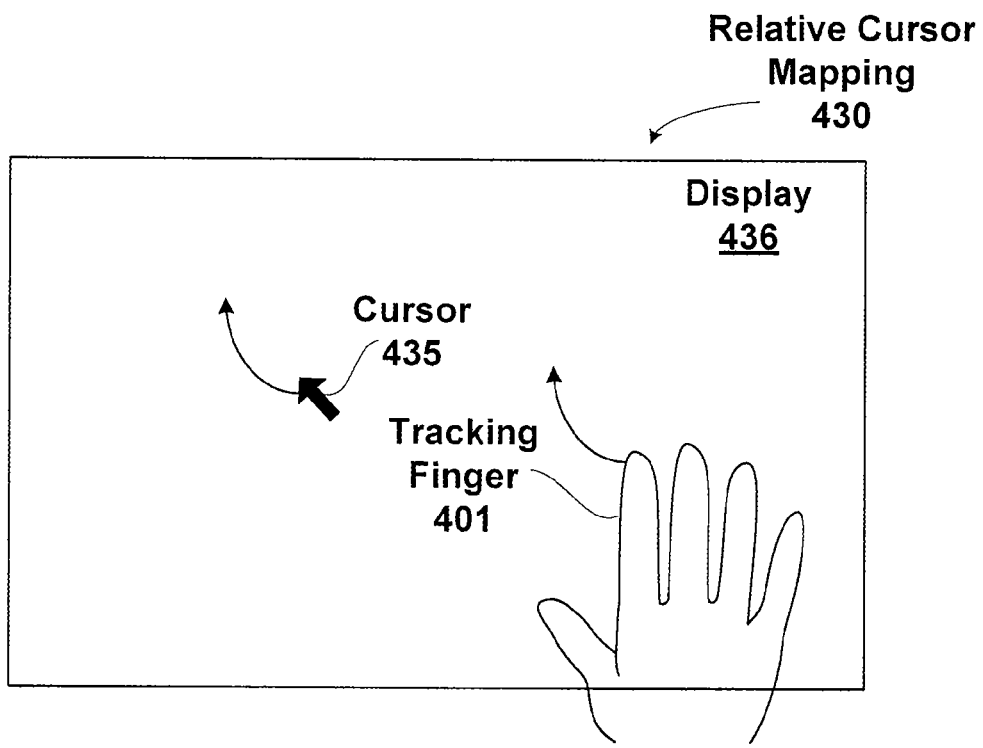
FIG. 4D illustrates a relative cursor mapping, according to one embodiment of the invention, according to one embodiment of the invention.

FIG. 4D illustrates a relative cursor mapping 430, according to one embodiment of the invention. Relative cursor mapping 430 also allows for the entire multi-touch display 436 to be accessed and may give a sense of familiarity to the end-user since it works like a mouse. The cursor 435 moves in the general direction of the movement of the tracking finger 401 and is not dependant on where the tracking finger 401 is on the multi-touch display 426. Clutching is possible and therefore, the cursor 435 can reach any position on the multi-touch display 426. The hand can be repositioned to avoid occluding the cursor 435.

Figure 5:
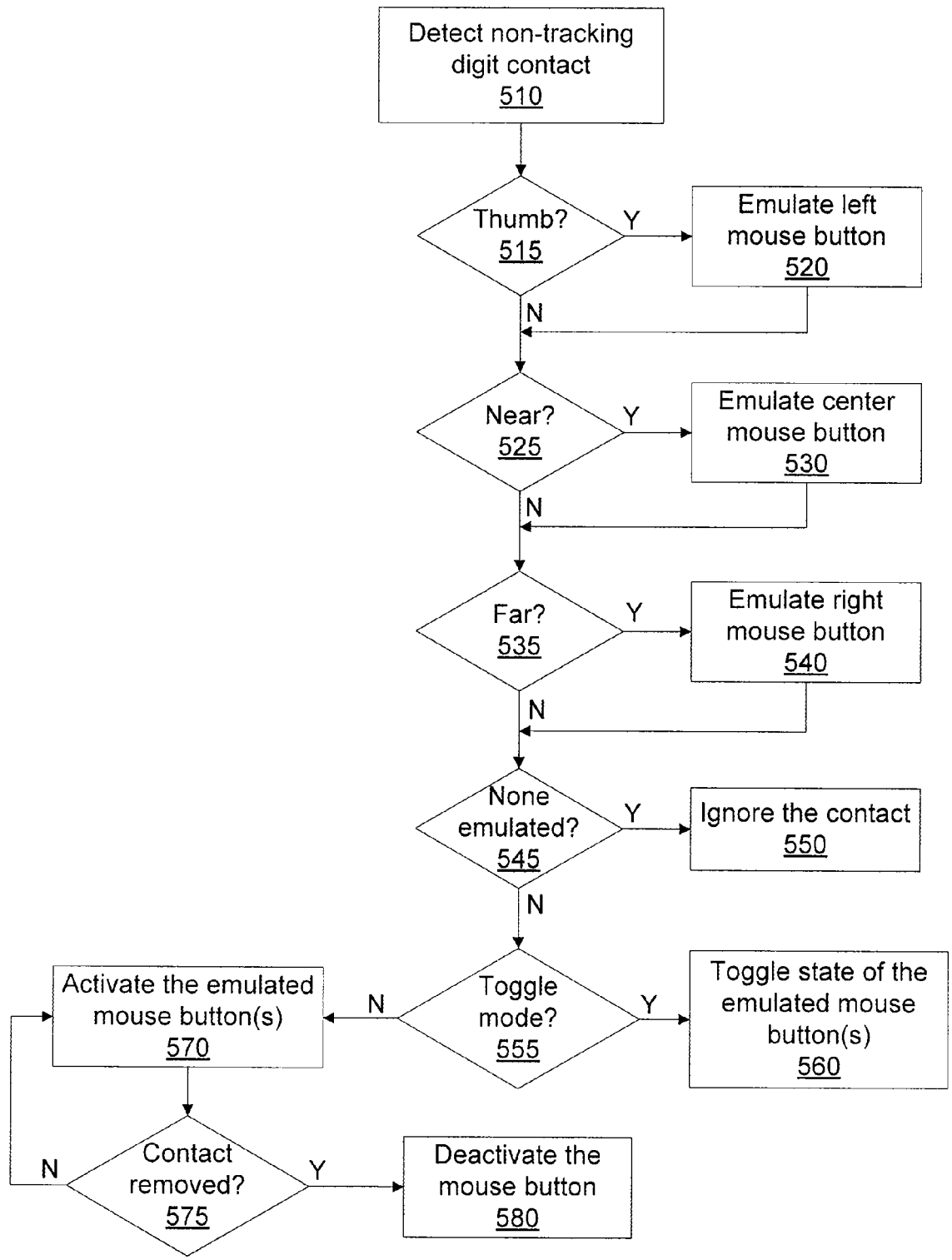
FIG. 5 illustrates is a flow diagram of method steps for emulating mouse buttons using a mouse-to-finger mapping, according to one embodiment of the invention.

FIG. 5 illustrates is a flow diagram of method steps for emulating mouse buttons using a mouse-to-finger mapping, according to one embodiment of the invention. Although the method steps are described in conjunction with the system of FIG. 1, persons skilled in the art will understand that any system configured to perform the method steps, in any order, is within the scope of the invention. Mouse button emulation relies on detection of one or more tracking digits while the other digits are used to activate one or more of the multiple mouse buttons. Contact with the tracking digit(s) is processed separately since the tracking digit(s) control movement of the cursor, independent of activating of the mouse buttons. The cursor is displayed on the multi-touch display device at a position based on one or more contacts between the tracking digit(s) and the multi-touch display device. The method steps illustrated in FIG. 5 correspond to the side-plus-distance mapping technique 300. Persons skilled in the art will understand how to modify the steps to correspond to other mapping techniques.

The method begins in step 510, where contact with the multi-touch input device and at least one non-tracking digit is detected by the multi-touch input device. A signal indicating that one or more non-tracking digit is in contact with the multi-touch input device may be generated by the multi-touch input device and provided to the application program 112. The signal indicates the position of the non-tracking digits in order for the application program 112 to identify which button(s) to activate or deactivate based on the digit to mouse button mapping technique that is used. In step 515, the application program 112 determines if the end-user's thumb is in contact with the multi-touch input device. Identification of the digit is based on the mapping technique that is used by the application program 112.

If, in step 515, the thumb is determined not to be in contact with the multi-touch input device, then the application program 112 proceeds directly to step 525. Otherwise, the thumb is determined to be in contact with the multi-touch input device, and, in step 520, the left mouse button is emulated by the thumb. In step 525, the application program 112 determines if the near finger is in contact with the multi-touch input device. If, in step 525 the near finger is determined not to be in contact with the multi-touch input device, then the application program 112 proceeds directly to step 535. Otherwise, the near finger is determined to be in contact with the multi-touch input device, and, in step 530, the center mouse button is emulated by the near finger. In step 535 the application program 112 determines if the far finger is in contact with the multi-touch input device. If, in step 535, the far finger is determined not to be in contact with the multi-touch input device, then the application program 112 proceeds directly to step 550. Otherwise, the far finger is determined to be in contact with the multi-touch input device, and, in step 540, the right mouse button is emulated by the far finger.

In step 545, the application program 112 determines if none of the mouse buttons is emulated by the non-tracking digit contact. If, in step 545 none of the digits has been determined to be in contact with the multi-touch input device, then, in step 550, the application program 112 ignores the contact. Otherwise, as set forth above, at least one non-tracking finger has been determined to be in contact with the multi-touch input device to emulate at least one mouse button, and, in step 555, the application program 112 determines if the toggle mode is enabled for button activation.

If, in step 555, the application program 112 determines that the toggle mode is enabled for button activation, then, in step 560, the state of the emulated mouse button(s) is toggled from active to not active or from not active to active by the application program 112. Otherwise, in step 570 the application program 112 activates the emulated mouse button(s). In step 575, the application program 112 determines if the contact(s) corresponding to one or more of the emulated mouse buttons have been removed from the multi-touch input device. When the contact(s) corresponding to one or more emulated mouse buttons have been removed, then each corresponding emulated mouse button enters the deactivated state set forth in step 580. When contact is maintained for one or more of the emulated mouse buttons, the application program returns to step 570, and each corresponding emulated mouse button remains in the activated state.

Figure 6:
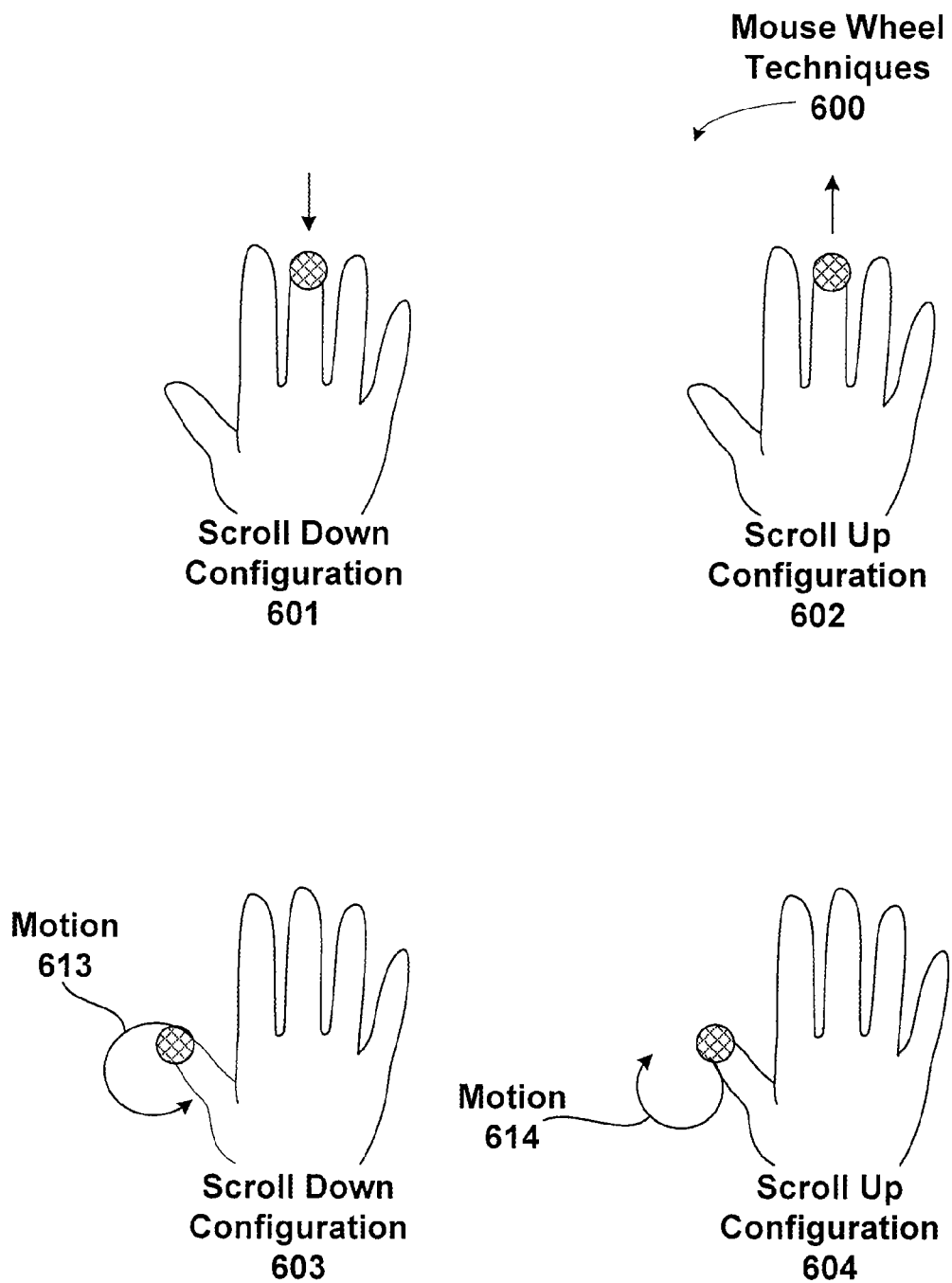
FIG. 6 illustrates motions that are mapped to mouse wheel functions, according to one embodiment of the invention.

FIG. 6 illustrates motions that are mapped to mouse wheel functions, according to one embodiment of the invention. A finger is moved across the multi-touch display in a downward direction for a scroll down configuration 601 to emulate moving the scrollwheel down. A finger is moved across the multi-touch display in an upward direction for a scroll up configuration 602 to emulate moving the scrollwheel up. Repeatedly swiping the finger up or down while the tracking finger is stationary may signal scrollwheel up/down events. The application program 112 receives a signal indicating that the finger is moved across the multi-touch display in a downward or upward direction to emulate movement of the scrollwheel.

Alternatively, thumb rotation may be used to emulate the scrollwheel. A counter-clockwise circular motion 613 with the thumb may be used to emulate moving the scrollwheel down in a scroll down configuration 603. A clockwise circular motion 614 with the thumb may be used to emulate moving the scrollwheel up in a scroll up configuration 604.

In sum, a technique is disclosed for providing end-users of multi-touch input devices with mouse emulation techniques. Mouse emulation allows an end-user to access mouse-based user interfaces of application programs when using a multi-touch input device. Various digit to mouse button mapping techniques may be used as well as different button activation modes and cursor position mappings. Since the mouse emulation techniques require only a single hand, the other hand is available to employ modifier keys (control, shift, etc) in conjunction with the mouse buttons. Digit to mouse button mapping techniques that minimize touch points and are timing independent are particularly comfortable and intuitive for the end-user, thereby improving the overall end-user experience.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for emulating mouse button functionality for a multi-touch input device, the method comprising:
   displaying a cursor on a display device at a position based on a tracking digit that is in contact with the multi-touch input device;
   receiving a signal indicating that a non-tracking digit is in contact with the multi-touch input device;
   determining which mouse button of a multiple button mouse is mapped to the non-tracking digit for emulation to produce an emulated mouse button; and
   activating the emulated mouse button or deactivating the emulated mouse button based on a button activation mode.

2. The method of claim 1, wherein the emulated mouse button is activated, and the button activation mode comprises a momentary activation mode.

3. The method of claim 2, further comprising the steps of:
   determining that the non-tracking digit is no longer in contact with the multi-touch input device; and
   deactivating the emulated mouse button.

4. The method of claim 1, wherein the button activation mode comprises a toggle activation mode, and the emulated mouse button is toggled from a not activated state to an activated state or from the activated state to the not activated state.

5. The method of claim 1, wherein the step of determining which button is mapped to the non-tracking digit comprises:
   determining that a side-plus-distance mapping technique has been implemented; and
   determining that a left mouse button of the multiple button mouse is mapped to the non-tracking digit and that the non-tracking digit comprises a thumb.

6. The method of claim 1, wherein the step of determining comprises:
   determining that a side-plus-distance mapping technique has been implemented; and
   determining that a center mouse button of the multiple mouse button is mapped to the non-tracking digit and that the non-tracking digit comprises a near finger.

7. The method of claim 1, wherein the step of determining comprises:
   determining that a side-plus-distance mapping technique has been implemented; and
   determining that a right mouse button of the multiple mouse button is mapped to the non-tracking digit and that the non-tracking digit comprises a far finger.

8. The method of claim 1, wherein the step of displaying the cursor comprises:
   determining that an offset cursor mapping technique has been implemented; and
   displaying the cursor on the display device at an offset relative to the position of the tracking digit on the display device.

9. The method of claim 1, further comprising the steps of:
   receiving a signal indicating that the non-tracking digit is moved across the multi-touch input device in a downward or upward direction;
   determining that a scrollwheel of the multiple button mouse is mapped to the non-tracking digit for emulation to produce an emulated scrollwheel; and
   activating the emulated scrollwheel.

10. The method of claim 1, further comprising the steps of:
    receiving a signal indicating that the non-tracking digit is moved in a circular motion across the multi-touch input device in either a clockwise or counter-clockwise direction;
    determining that a scrollwheel of the multiple button mouse is mapped to the non-tracking digit for emulation to produce an emulated scrollwheel; and
    activating the emulated scrollwheel.

11. A computer-readable medium including instructions that, when executed by a processing unit, cause the processing unit to provide emulation of mouse button functionality for a multi-touch input device, by performing the steps of:
    displaying a cursor on a display device at a position based on a tracking digit that is in contact with the multi-touch input device;
    receiving a signal indicating that a non-tracking digit is in contact with the multi-touch input device;
    determining which mouse button of a multiple button mouse is mapped to the non-tracking digit for emulation to produce an emulated mouse button; and
    activating the emulated mouse button or deactivating the emulated mouse button based on a button activation mode.

12. The computer-readable medium of claim 11, wherein the emulated mouse button is activated, and the button activation mode comprises a momentary activation mode.

13. The computer-readable medium of claim 12, further comprising the steps of:
determining that the non-tracking digit is no longer in contact with the multi-touch input device; and
deactivating the emulated mouse button.

14. The computer-readable medium of claim 11, wherein the button activation mode comprises a toggle activation mode, and the emulated mouse button is toggled from a not activated state to an activated state or from the activated state to the not activated state.

15. The computer-readable medium of claim 11, wherein the step of determining which button is mapped to the non-tracking digit comprises:
determining that a side-plus-distance mapping technique has been implemented; and
determining that a left mouse button of the multiple button mouse is mapped to the non-tracking digit and that the non-tracking digit comprises a thumb.

16. The computer-readable medium of claim 11, wherein the step of determining comprises:
determining that a side-plus-distance mapping technique has been implemented; and
determining that a center mouse button of the multiple mouse button is mapped to the non-tracking digit and that the non-tracking digit comprises a near finger.

17. The computer-readable medium of claim 11, wherein the step of determining comprises:
determining that a side-plus-distance mapping technique has been implemented; and
determining that a right mouse button of the multiple mouse button is mapped to the non-tracking digit and that the non-tracking digit comprises a far finger.

18. The computer-readable medium of claim 11, wherein the step of displaying the cursor comprises:
determining that an offset cursor mapping technique has been implemented; and
displaying the cursor on the display device at an offset relative to the position of the tracking digit on the display device.

19. The computer-readable medium of claim 11, further comprising the steps of:
receiving a signal indicating that the non-tracking digit is moved across the multi-touch input device in a downward or upward direction;
determining that a scrollwheel of the multiple button mouse is mapped to the non-tracking digit for emulation to produce an emulated scrollwheel; and
activating the emulated scrollwheel.

20. The computer-readable medium of claim 11, further comprising the steps of:
receiving a signal indicating that the non-tracking digit is moved in a circular motion across the multi-touch input device in either a clockwise or counter-clockwise direction;
determining that a scrollwheel of the multiple button mouse is mapped to the non-tracking digit for emulation to produce an emulated scrollwheel; and
activating the emulated scrollwheel.

21. A computing system configured to emulate mouse button functionality, comprising:
a multi-touch input device; and
a processor that is configured to:
display a cursor on a display device at a position based on a tracking digit that is in contact with the multi-touch input device;
receive a signal indicating that a non-tracking digit is in contact with the multi-touch input device;
determine which mouse button of a multiple button mouse is mapped to the non-tracking digit for emulation to produce an emulated mouse button; and
activate the emulated mouse button or deactivate the emulated mouse button based on a button activation mode.

22. The computing system of claim 21, wherein the multi-touch input device is integrated with the display device.

23. The method of claim 1, further comprising:
moving the cursor based on movement of the tracking digit while the emulated mouse button is activated,
wherein movement of the non-tracking digit does not cause movement of the cursor.

24. The method of claim 1, wherein receiving a signal indicating that the non-tracking digit is in contact with the multi-touch input device further comprises:
receiving a signal indicating that the non-tracking digit is in contact with the multi-touch input device while moving the cursor based on movement of the tracking digit.

* * * * *